United States Patent [19]

Luginbühl

[11] 4,101,420

[45] Jul. 18, 1978

[54] APPARATUS FOR ORIENTING AND SORTING ELONGATED ARTICLES

[75] Inventor: Pierre Luginbühl, Neuhausen am Rheinfall, Switzerland

[73] Assignee: S I G Schweizerische Industrie-Gesellschaft, Neuhausen am Rheinfall, Switzerland

[21] Appl. No.: 783,452

[22] Filed: Mar. 31, 1977

[30] Foreign Application Priority Data

Apr. 1, 1976 [CH] Switzerland ............... 4091/76

[51] Int. Cl.² ........................................... B07B 13/04
[52] U.S. Cl. ............................................... 209/104
[58] Field of Search ........................... 209/104, 82, 87

[56] References Cited

U.S. PATENT DOCUMENTS

| 1,677,838 | 7/1928 | Molin | 209/104 |
| 2,257,352 | 9/1941 | Silver | 209/104 |

Primary Examiner—Allen N. Knowles
Attorney, Agent, or Firm—Spencer & Kaye

[57] ABSTRACT

An apparatus for sorting and orienting elongated articles of predetermined length has at least two substantially horizontal shafts supported in a parallel-spaced relationship; a pair of axially spaced discs mounted on each shaft. The axial distance between the discs of any disc pair is less than the predetermined length of the articles. Any successive two discs mounted on different shafts are in an overlapping relationship as viewed in a direction parallel to the shafts. Each disc has a non-overlapping upper circumferential portion oriented in the direction of article feed. The articles are successively positioned, in a generally transverse orientation with respect to the direction of article feed, on the discs of the first disc pair as viewed in the direction of article feed. The discs are driven unidirectionally for effecting movement of each circumferential portion in the direction of article feed for advancing each article successively on the circumferential portions of successive discs in the direction of article feed, effecting thereby an alignment of the articles into an orientation perpendicular to the direction of article feed and effecting, between the discs of a disc pair, dropout of articles that are shorter than the predetermined length.

5 Claims, 2 Drawing Figures

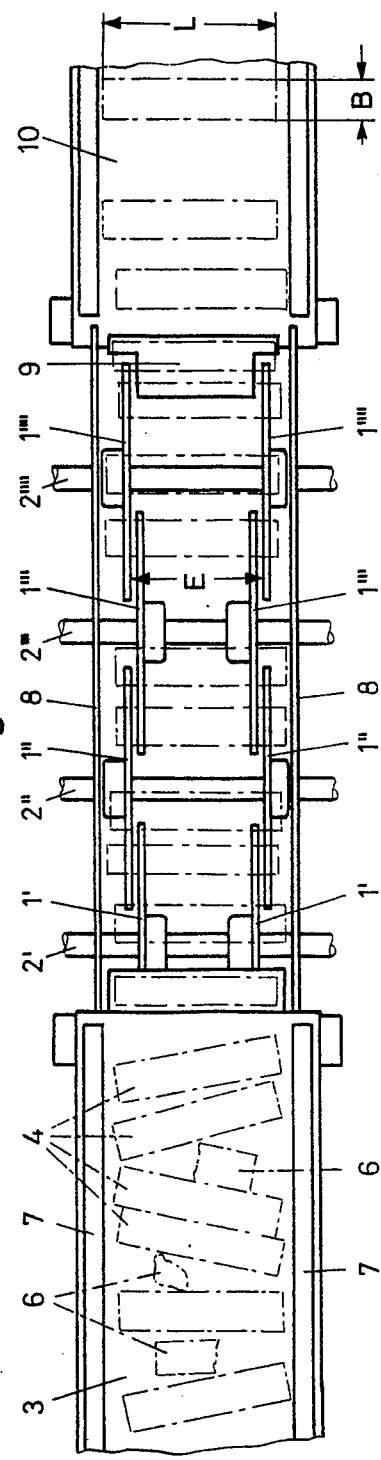

APPARATUS FOR ORIENTING AND SORTING ELONGATED ARTICLES

BACKGROUND OF THE INVENTION

This invention relates to sorting and aligning elongated articles as they are being advanced along a conveying path (direction of article feed). The articles may be, for example, candy bars which are being advanced to a wrapping machine.

In order to avoid operational disturbances during wrapping, it is important that no articles are fed into the wrapping machine which are too short (for example, broken articles) or which are not oriented perpendicularly to the direction of article feed.

Heretofore, as a rule, a worker was assigned the task to properly align the obliquely oriented articles and to manually remove rejects. With the increased productivity of wrapping machines, not only has this manual task become more and more difficult to perform, but also malfunctions, caused by a faulty article, have become more frequent.

SUMMARY OF THE INVENTION

It is an object of the invention to provide, in lieu of the manual operation required heretofore, an apparatus which automatically corrects the orientation of longitudinal articles into an accurate perpendicular alignment with respect to the direction of conveyance and removes articles of inadequate dimensions (rejects).

This object and others to become apparent as the specification progresses, are accomplished by the invention, according to which, briefly stated, the apparatus for sorting and orienting elongated articles of predetermined length has at least two substantially horizontal shafts supported in a parallel-spaced relationship and a pair of axially spaced discs mounted on each shaft. The axial distance between the discs of any disc pair is less than the predetermined length of the articles. Any successive two discs mounted on different shafts are in an overlapping relationship as viewed in a direction parallel to the shafts. Each disc has a non-overlapping upper circumferential portion oriented in the direction of article feed. The articles are successively positioned, in a generally transverse orientation with respect to the direction of article feed, on the discs of the first disc pair as viewed in the direction of article feed. The discs are driven unidirectionally for effecting movement of each circumferential portion in the direction of article feed for advancing each article successively on the circumferential portions of successive discs in the direction of article feed, effecting thereby an alignment of the articles into an orientation perpendicular to the direction of article feed and effecting, between the discs of a disc pair, a dropout of articles that are shorter than the predetermined length.

BRIEF DESCRIPTION OF THE DRAWINGS

FIG. 2 is a schematic top plan view of the same embodiment.

DESCRIPTION OF THE PREFERRED EMBODIMENT

Figure 1:
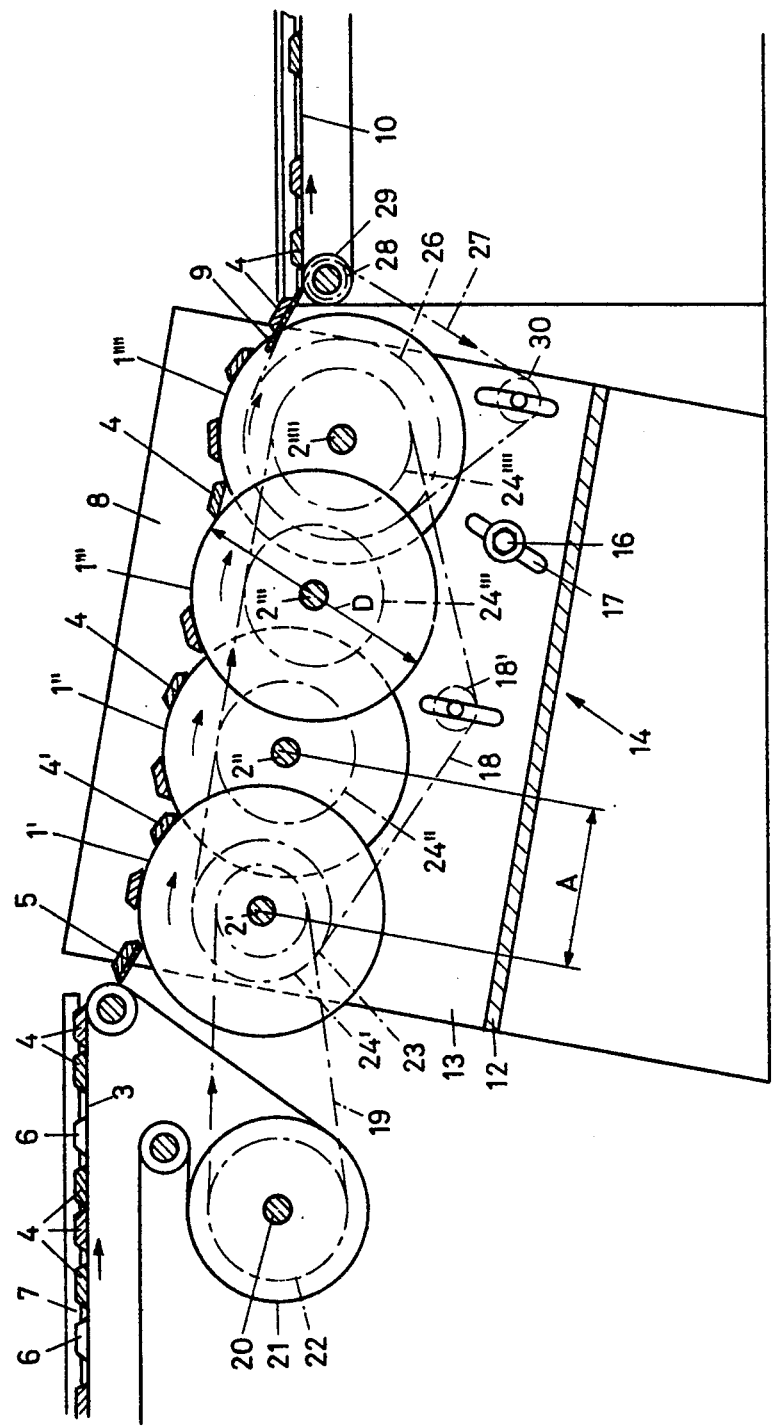
FIG. 1 is a schematic sectional side elevational view of a preferred embodiment of the invention.

Turning now to the Figures, the apparatus shown therein comprises four pairs of identically dimensioned discs 1', 1", 1''' and 1'''' which are arranged pair wise on spaced horizontal shafts 2', 2", 2''' and 2'''', respectively and which are driven in unison and unidirectionally as indicated by the arcuate arrows in FIG. 1. As viewed in the direction of conveyance, the height position of the shafts 2" and 2''' and 2'''' is successively reduced with respect to the first shaft 2'. The height position of the shafts (which are supported, for example, in a machine frame, not shown) and thus the inclination of the stepped descent is preferably adjustable.

In order to provide for such an adjustment, the shafts 2", 2''' and 2'''' are supported in two side walls 13 which are connected with each other by a main wall 12. The wall assembly 12, 13 is pivotally mounted on the shaft 2' and the latter is mounted in the two guide walls 8 which are disposed opposite each other. The walls 12, 13 constitute a support structure 14 which thus can be pivoted about the shaft 2' in order to change the inclination. The support structure 14 may be locked in a given position by a screw 16 which is provided in one of the guide walls 8 and which is inserted into a slot 17 provided in a side wall 13.

Articles 4, such as candy bars which are oriented generally transversely to the direction of advance on the upper flight of a conveyor belt 3, are transferred by means of a slide 5 onto the upper circumferential sector of the first pair of discs 1'. The discs 1' further advance the articles 4 to the position 4' where the articles abut against the discs 1" which are situated adjacent the discs 1' and which overlap the discs 1'. Should an article in the position 4' be situated exactly perpendicularly to the direction of advance on both discs 1', both article ends pass simultaneously onto the one and the other disc 1" which now take over further conveyance of the article in the direction of feed. Should, however, the article in the position 4' deviate from its desired orientation, one end of that article arrives on one of the discs 1" before the other end of the article does so on the other disc 1" and thus that article is retained until its other end too, reaches the other disc 1" or has at least approximately reached it. This results in an alignment of the article from its position 4' into a position that is perpendicular to the direction of advance. As the article 4 is transferred from the discs 1" to the discs 1''' or from the latter to the discs 1'''', this alignment is further improved in case such an improvement is needed (which, as a rule, would not be the case). As seen in the Figures, the discs 1''' of the third disc pair (carried by shaft 2''') and the discs 1'''' of the fourth disc pair (carried by shaft 2'''') are in an overlapping relationship with discs 1" and 1''', respectively. Thus, the conveyance and alignment of articles occurs on the upper, non-overlapping circumferential portion (sector) of discs 1'-1''''.

A precise alignment of the articles 4 is of significance if the articles 4 are to be fed to a wrapping machine. It is further of great significance that the apparatus, according to the invention, does not permit further conveyance of articles which do not have the required length, particularly such as fragments 6. For this purpose the axial distance between the discs forming each disc pair is so designed that impermissibly short articles (rejects) drop between the discs of the respective disc pairs and are therefore removed from the articles that are being further processed.

The remote risk that an article 4 is too long or is oriented with a too great eccentricity with respect to the longitudinal center line of the conveying path is eliminated by means of two guide strips 7 arranged on either side of the conveyor belt 3 and by two guide walls 8 which are arranged along the discs 1' through 1"" and which are secured in a stationary manner.

The discs 1' of the first pair are situated somewhat closer to one another than the discs 1" of the second pair in order to ensure that an obliquely arranged article, which otherwise has the sufficient length, is not immediately eliminated but, after a certain alignment into position 4' arrives at the discs 1" which constitute the second disc pair and which have a larger axial distance.

Preferably, the driving arrangement for the conveyor belt 3, and for the discs 1'-1"" and/or the dimensioning of the latter is such that the circumferential speed of the discs 1'-1"" is preferably somewhat greater than the conveying speed of the conveyor belt 3, whereby the distance between successive articles 4 is increased. From the discs 1"" the articles 4 are transferred by a slide 9 onto an endless conveyor belt 10 which, for example, advances the articles directly to a wrapping machine or to another check point, for example, a device which verifies whether the articles are within the desired thickness values or whether two articles are in a superposed condition. Such additional devices then eliminate the undesired article.

The sorting and aligning apparatus described above is of very simple structure and is very effective. Even in case of very rapidly working wrapping machines (for example, 300 wrappings per minute) no more disturbances are experienced (particularly when the above-mentioned thickness checking device is also utilized).

In the embodiment described above all discs of the disc pairs have identical diameters. It is to be understood that such an identity is not required: for example, the diameters of the disc pairs may decrease in the direction of conveyance.

It is further feasible to eliminate the step-like arrangement of the disc pairs. With the proper selection of the diameters of the discs of the individual disc pairs and an expedient coordination of the mutual overlaps, the desired aligning and sorting effect can also be achieved with a horizontal (i.e. non-stepped) arrangment.

The conveyor belt 3 runs over a roller 21 which is mounted on a driven shaft 20. A sprocket 22 is also seated on the shaft 20 and drives a chain 19 which is connected to another sprocket 23. The latter is seated on the shaft 2' and is fixedly connected to the disc 1'.

A further sprocket 24' which is also seated on the shaft 2', drives, via a chain 18, additional sprockets 24", 24''' and 24'''' and thus also drives the shafts 2", 2''', 2'''' (FIG. 1). All discs therefore rotate in the same direction. In order to tighten the chain 18 a tightening roller 18' is provided. From the drawing it may be seen that the circumferential velocity of the discs is greater than the advance speed of the conveyor belt. A supplementary sprocket 26 is mounted on the shaft 2'''' and is provided with a chain 27 for driving a sprocket 28 which is connected with a drive roller 29 for the conveyor belt. The chain 27 may be tigthened by a tightening roller 30.

As may been see in FIG. 2, the articles 4 have a length L and a width B. In a preferred embodiment the distance E of the outer discs (i.g. 1") from each other may be of 0.8 L. The diameter D (FIG. 1) of the discs is approximately 5B and the distance A is 0.7 D.

It will be understood that the above description of the present invention is susceptible to various modifications, changes and adaptations, and the same are intended to be comprehended within the meaning and range of equivalents of the appended claims.

What is claimed is:

1. An apparatus for sorting and orienting elongated articles of predetermined length, comprising:
   (a) at least two substantially horizontal shafts supported in a parallel-spaced relationship;
   (b) a pair of axially spaced discs mounted on each shaft; the axial distance between the discs of any disc pair being less than said predetermined length; any successive two discs mounted on different shafts being in an overlapping relationship as viewed in a direction parallel to said shafts; each disc having a non-overlapping upper circumferential portion; the orientation of the circumferential portions of successive discs determining the direction of article feed;
   (c) means for successively positioning articles on the first disc pair as viewed in said direction of article feed, in a generally transverse orientation with respect to said direction of article feed; and
   (d) means for driving said discs unidirectionally for effecting movement of each said circumferential portion in said direction of article feed for advancing each article successively on the circumferential portions of successive discs in said direction of article feed, effecting alignment of articles into an orientation perpendicular to said direction of article feed and effecting, between the discs of one of said disc pairs, dropout of articles shorter than said predetermined length.

2. An apparatus as defined in claim 1, wherein said discs are of identical diameter, and the height position of said shafts successively decreases in said direction of article feed.

3. An apparatus as defined in claim 1, further comprising means for adjusting the height position of at least one of said shafts.

4. An apparatus as defined in claim 1, wherein the axial distance between the discs of said first disc pair is greater than the axial distance between the discs of the disc pair immediately succeeding said first disc pair.

5. An apparatus as defined in claim 1, further comprising a conveyor arranged upstream of said first disc pair as viewed in said direction of article feed for advancing the articles to said first disc pair; and means to drive said discs at a greater circumferential speed than the traveling speed of said conveyor.

* * * * *